(12) United States Patent
Li et al.

(10) Patent No.: US 10,479,564 B2
(45) Date of Patent: Nov. 19, 2019

(54) CONTAINER SEALING LID WITH UTENSIL HOLDER

(71) Applicants: Foshangshi Baichong Pet Product Technology Co., LTD, Foshan (CN); Charm Talent International Trading Limited, Wan Chai, Hong Kong (HK)

(72) Inventors: Riu Li, Foshan (CN); Shangjie Liang, Guangzhou (CN)

(73) Assignee: Charm Talent International Trading Limited, Wan Chai (HK)

( * ) Notice: Subject to any disclaimer, the term of this patent is extended or adjusted under 35 U.S.C. 154(b) by 0 days.

(21) Appl. No.: 15/895,105

(22) Filed: Feb. 13, 2018

(65) Prior Publication Data

US 2019/0084730 A1 Mar. 21, 2019

(30) Foreign Application Priority Data

Sep. 20, 2017 (CN) .................... 2017 2 1213753 U (51) Int. Cl.
*A47G 21/00* (2006.01)
*A47G 21/14* (2006.01)
(Continued)

(52) U.S. Cl.
CPC ......... *B65D 43/0208* (2013.01); *A47G 19/00* (2013.01); *B65D 43/0212* (2013.01); *B65D 43/0218* (2013.01); *B65D 51/245* (2013.01); *B65D 51/246* (2013.01); *B65D 81/366* (2013.01); *A47G 19/186* (2013.01); *A47J 43/287* (2013.01); *A47J 47/02* (2013.01); *B65D 2543/0074* (2013.01);
(Continued)

(58) Field of Classification Search
CPC .......... B65D 2543/00296; B65D 2543/00537; B65D 2543/00629; B65D 2543/0074; B65D 2543/00796; B65D 2543/00842; B65D 51/246; B65D 43/0208; B65D 43/0212; B65D 81/366; B65D 2251/06; B65D 83/285; B65D 2203/00; B65D 23/12; A47G 21/145; A47J 47/02
USPC ........ 426/112, 120, 115; 220/212, 735, 697, 220/711, 793, 287, 376; 294/176; 206/216, 217, 223, 457; D9/451; 248/37.3; 215/227; 30/169, 301, 123, 30/324
See application file for complete search history.

(56) References Cited

U.S. PATENT DOCUMENTS

| | | | | |
|---|---|---|---|---|
| 700,653 A | * | 5/1902 | Jobson | A47G 21/145 131/242 |
| 1,211,062 A | * | 1/1917 | Bowman | A47G 21/04 15/236.01 |

(Continued)

*Primary Examiner* — Gideon R Weinerth
(74) *Attorney, Agent, or Firm* — Maginot, Moore & Beck LLP (57) ABSTRACT

A kit for sealing an open container includes a utensil and a lid. The lid includes a lid body, a sealing mechanism, and at least one holding lug. The sealing mechanism is positioned on an inner face of the lid body, and is configured to sealingly engage an opening of a container to enable the lid to seal the opening of the container. The at least one holding lug extends radially outward from the lid body, and has a through hole extending along a direction perpendicular to the inner face. The through hole is configured to mount the utensil on the lid when the lid is engaged with a container.

15 Claims, 4 Drawing Sheets

(51) Int. Cl.
  *B65D 43/02*   (2006.01)
  *B65D 51/24*   (2006.01)
  *B65D 81/36*   (2006.01)
  *A47G 19/00*   (2006.01)
  *A47J 43/28*   (2006.01)
  *A47J 47/02*   (2006.01)
  *A47G 19/18*   (2006.01)

(52) U.S. Cl.
  CPC ........... *B65D 2543/00092* (2013.01); *B65D 2543/00296* (2013.01); *B65D 2543/00305* (2013.01); *B65D 2543/00518* (2013.01); *B65D 2543/00537* (2013.01); *B65D 2543/00629* (2013.01); *B65D 2543/00731* (2013.01); *B65D 2543/00796* (2013.01); *B65D 2543/00842* (2013.01)

(56) References Cited

U.S. PATENT DOCUMENTS

| | | | | |
|---|---|---|---|---|
| D131,297 S * | 2/1942 | Donovan | | D7/544 |
| 2,630,237 A * | 3/1953 | Rosenlof | | B65D 41/225 |
| | | | | 220/694 |
| 2,634,497 A * | 4/1953 | Waldesbuehl | | A47G 21/04 |
| | | | | 15/236.08 |
| 2,731,751 A * | 1/1956 | Green | | B44C 5/00 |
| | | | | 215/229 |
| 3,157,304 A * | 11/1964 | Judge | | B65D 43/0212 |
| | | | | 215/253 |
| D205,102 S * | 6/1966 | Pawelka | | D10/46 |
| 3,380,307 A * | 4/1968 | De Frank | | A47G 21/04 |
| | | | | 141/110 |
| 3,381,876 A * | 5/1968 | Biggins | | A47G 23/06 |
| | | | | 206/229 |
| 4,695,029 A * | 9/1987 | Fox | | B65D 83/285 |
| | | | | 248/230.1 |
| 4,836,396 A * | 6/1989 | Ancona | | A21C 11/106 |
| | | | | 206/457 |
| D371,485 S * | 7/1996 | Hickey | | D7/391 |
| 5,695,084 A * | 12/1997 | Chmela | | A47G 21/04 |
| | | | | 206/541 |
| 5,695,086 A | 12/1997 | Viola | | |
| 5,706,546 A * | 1/1998 | Utley | | A47J 43/281 |
| | | | | 15/143.1 |
| 5,806,669 A * | 9/1998 | Kim | | B65D 83/285 |
| | | | | 206/228 |
| 5,875,515 A * | 3/1999 | Dallas | | A47J 43/288 |
| | | | | 15/236.01 |
| D417,152 S * | 11/1999 | Keller | | D9/451 |
| D422,502 S * | 4/2000 | Keller | | D9/451 |
| 6,179,259 B1 * | 1/2001 | Schioldager | | B65D 83/40 |
| | | | | 206/228 |
| D484,358 S * | 12/2003 | Roth | | D7/392.1 |
| D503,617 S * | 4/2005 | Roth | | D9/451 |
| D512,644 S * | 12/2005 | Wolters | | D9/609 |
| D512,645 S * | 12/2005 | Wolters | | D9/611 |
| 7,073,935 B2 * | 7/2006 | Liem | | B01F 13/002 |
| | | | | 15/236.06 |
| D534,033 S * | 12/2006 | Roth | | D7/392.1 |
| 7,172,072 B2 * | 2/2007 | Schiltz | | B65D 1/36 |
| | | | | 206/457 |
| 7,540,833 B2 * | 6/2009 | Johns | | B65D 1/36 |
| | | | | 493/152 |
| 7,644,832 B1 | 1/2010 | Tsenga et al. | | |
| D681,400 S * | 5/2013 | Gold | | D7/628 |
| D750,837 S * | 3/2016 | Gast | | D28/57 |
| D773,932 S * | 12/2016 | Katopis | | D9/451 |
| 2002/0117871 A1 * | 8/2002 | Kleinpell | | A47J 47/02 |
| | | | | 294/176 |
| 2004/0074912 A1 * | 4/2004 | Johnson | | B65D 43/0202 |
| | | | | 220/793 |
| 2005/0115965 A1 * | 6/2005 | Gibson | | B29C 45/14336 |
| | | | | 220/212 |
| 2005/0218141 A1 * | 10/2005 | Kratzer | | A47G 19/186 |
| | | | | 220/212 |
| 2010/0229319 A1 * | 9/2010 | Phillips | | A45D 40/26 |
| | | | | 15/236.09 |
| 2013/0181467 A1 * | 7/2013 | Truesdell | | A47G 21/04 |
| | | | | 294/176 |
| 2015/0047998 A1 * | 2/2015 | Horn | | B65D 67/02 |
| | | | | 206/459.5 |
| 2017/0334619 A1 * | 11/2017 | Desloge | | B65D 51/246 |

* cited by examiner

CONTAINER SEALING LID WITH UTENSIL HOLDER

This application claims priority under 35 U.S.C. § 119 to patent application no. CN 201721213753.6, filed on Sep. 20, 2017 in China, the disclosure of which is incorporated herein by reference in its entirety.

This disclosure relates to lids for sealing containers, and more particularly to sealing lids with a utensil holder and a utensil optimized for removing material from containers.

BACKGROUND

Many types of conventional containers, such as cans and tins, are not easily resealed after being opened. Generally, opening a sealed container such as a can or tin physically separates a lid portion from a body portion in such a way that it is not typically possible to replace the lid portion to reseal the interior of the container. Many other types of containers, such as bowls, cups, etc., do not typically include a means for sealing the container.

Techniques have been developed to address this difficulty. In one example, a lid formed from a flexible material such as plastic is used to seal off the opening of an open container. However, containers come in a wide range of sizes and shapes, with the result that a wide range of replacement lids are also required. Even if a lid fits onto a container, gripping the lid during installation or removal may be difficult, and continued use of the lid may degrade the structure of the lid over time.

To address the need for a wide range of size and shape lids, lids have been developed that are configured to seal multiple different size openings. In one such example, an under-side of a flexible lid includes multiple concentric grooves sized to sealingly fit over multiple sizes of openings. While the flexibility of such a lid enables the concentric grooves to seal cans of different sizes, it also can make gripping the lid during installation and removal from a container difficult. Gripping an under-side of the lid to remove the lid from the can may cause the lid to gradually stretch or deform over time, and may lead to the user's hand coming into contact with the contents of the can. Therefore, a lid that is not only is configured to seal containers of different sizes, but also that is adapted to interaction with a user's hand for installation and removal would be beneficial.

Additionally, many of the types of goods generally stored in containers may be difficult to remove without the aid of a utensil. For example, wet foods such as pet food, baby food, etc., may partially adhere to the container, with the result that some of the goods remains in the container and is wasted. Generally, a utensil to assist with removing such wet goods would be separate from the container. Further, conventional utensils are not optimized for removing such wet goods from inside containers. Therefore, a utensil optimized for removing goods from a can, and a technique for storing such a utensil with the can would also be beneficial.

SUMMARY

This disclosure relates to a lid for sealing containers and holding a utensil which has a simple structure, is easy to use, and can meet the demand of sealing containers with different sizes.

In an exemplary embodiment, a lid for sealing a container includes a lid body, a sealing mechanism, and at least one holding lug. The lid body includes an inner face extending in a horizontal manner when the lid is disposed on an upright container. The sealing mechanism is positioned on the inner face of the lid body, and is configured to sealingly engage an opening of the container to enable the lid to seal the opening of the container. The at least one holding lug extends radially outward from the lid body, and includes a through hole extending along a direction perpendicular to the extension of the inner face of the lid body.

In some embodiments, the sealing mechanism includes a plurality of concentric sealing grooves extending from the inner face of the lid body along the direction perpendicular to the extension of the inner face.

In some embodiments, the at least one holding lug further includes at least one projection extending from an inner sidewall of the at least one holding lug that defines the through hole.

In some embodiments, the at least one holding lug is sized and configured to receive a human finger.

In some embodiments, the through hole has a non-circular cross section.

In some embodiments, the lid body further includes an outer face opposite the inner face. The outer face has a pattern layer with a portion of an image of an object. The at least one holding lug has a shape and position that cooperates with the portion of the image of the object to form the image.

In some embodiments, the at least one holding lug and the plurality of concentric sealing grooves are integral with the lid body.

In another exemplary embodiment, a kit for sealing an open container includes a utensil and a lid. The lid includes a lid body, a sealing mechanism, and at least one holding lug. The lid body has an inner face extending in a horizontal manner when the lid is disposed on an upright container. The sealing mechanism is positioned on the inner face of the lid body, and is configured to sealingly engage an opening of the container to enable the lid to seal the opening of the container. The at least one holding lug extends radially outward from the lid body, and includes a through hole extending along a direction perpendicular to the extension of the inner face of the lid body. The through hole is configured to mount the utensil on the lid when the lid is engaged with the container.

In some embodiments, the sealing mechanism includes a plurality of concentric sealing grooves extending from the inner face of the lid body along the direction perpendicular to the extension of the inner face.

In some embodiments, the through hole has a non-circular cross-section, and the utensil has a handle region with a cross-section that is configured to be received in the non-circular cross-section of the through hole.

In some embodiments, the utensil has a handle region with a cross-section that tapers from a diameter that is larger than a diameter of the through hole to a diameter that is smaller than the diameter of the through hole, such that at least a portion of the handle region extends above the lid when the utensil is mounted in the lid.

In some embodiments, at least one of (i) the at least one holding lug is sized and configured to receive a human finger, and (ii) the at least one holding lug further includes at least one projection extending from an inner sidewall of the at least one holding lug that defines the through hole.

In some embodiments, the at least one projection is configured to engage the utensil such that at least a portion of a handle region of the utensil extends above the lid when the utensil is mounted in the lid.

In some embodiments, the at least one holding lug further includes a grip portion within the through hole.

In some embodiments, the utensil includes a scoop having a substantially flat end edge configured to scrape against a bottom surface of the container.

In some embodiments, the end edge and the scoop come together to form a corner portion at each end of the end edge, the corner portion configured to scrape material off from a corner between the bottom surface of the container and an inner wall of the container.

In some embodiments, the utensil further includes a scraper that tapers at an acute angle and that is configured to scrape against an inner wall of the container.

In some embodiments, the at least one holding lug and the plurality of concentric sealing grooves are integral with the lid body.

In some embodiments, the lid body further includes an outer face opposite the inner face. The outer face has a pattern layer with a portion of an image of an object. The at least one holding lug has a shape and position that cooperates with the portion of the image of the object to form the image.

In some embodiments, the lid is one of a plurality of similarly configured lids, each lid having a respective pattern layer and at least one holding lug that forms images of different objects.

This summary is intended only to introduce subject matter pertaining to a bushing service tool which is discussed in more detail in the detailed description, the drawings, and the claims, and is not intended to limit the scope of this disclosure in any way.

BRIEF DESCRIPTION OF THE DRAWINGS

The foregoing aspects and other features of the present disclosure are explained in the following description, taken in connection with the accompanying drawings. In the drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
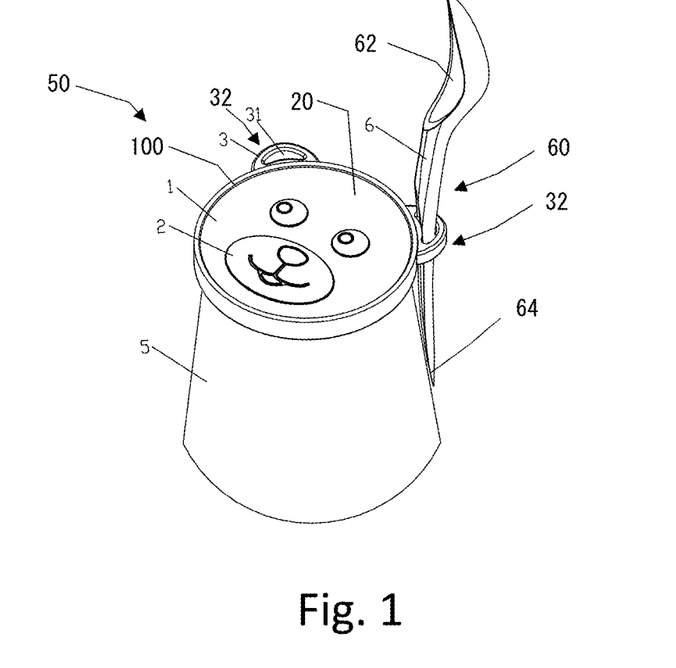
FIG. 1 depicts a perspective view of an exemplary embodiment of a sealing kit with a lid and a utensil in use to seal a container according to this disclosure.

FIG. 1 depicts an exemplary embodiment of a kit 50 for sealing an open container 5 according to this disclosure. The kit 50 includes a lid 100 and a utensil 6. The lid 100 is configured to seal off the open container 5, and includes a lid body 1, a pattern layer 2, and at least one holding lug, which in the instant embodiment comprises two holding lugs 3. Each holding lug 3 extends radially outward from the lid body 1, and includes a through hole 31. The utensil 6 is removably mounted on the lid 100 via the through hole 31.

Figure 2:
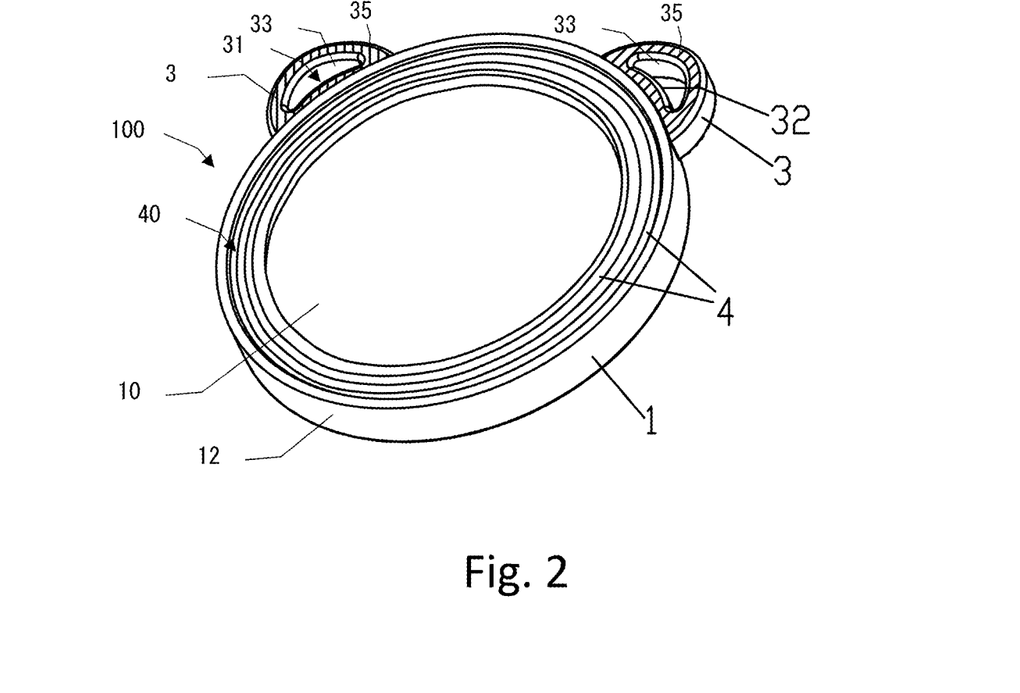
FIG. 2 depicts a perspective view of the underside of the lid from FIG. 1.

FIG. 2 depicts a bottom perspective view of the lid 100 from FIG. 1. As depicted in FIG. 2, the lid body 1 includes an inner face 10 and an annular face 12.

The inner face 10 extends substantially horizontally when the lid 100 is properly disposed on the upright container 5. The inner face 10 includes first grip portion 35 and a sealing mechanism 40.

The first grip portion 35 has a structure adapted for being gripped by a human fingertip. Any acceptable gripping structure is usable, such a roughened surface, an undercut, one or more grooves or projections, etc. In this embodiment, the first grip portion 35 includes a grid of square-shaped indentations extending into the inner face 10.

In this embodiment, the first grip portion 35 is defined by a portion of the inner face 10 that forms the lugs 3. In other embodiments, more or less portions of the inner face 10 define the first grip portion 35.

The sealing mechanism 40 is configured to engage an opening of a container to enable the lid 100 to seal the opening of the container. Any acceptable sealing mechanism is usable in different embodiments of the lid 100. In this embodiment, the sealing mechanism 40 includes three concentric sealing grooves 4 that extend from the inner face 10 along a direction perpendicular to the inner face 10. In other embodiments, any number of grooves is included. In addition to the grooves 4 being concentric, each individual groove in the plurality of grooves 4 has a different diameter. As a consequence, each groove in the plurality of grooves 4 is configured to sealingly engage a container of a different corresponding diameter to enable the lid 100 to selectively seal off differently sized containers. The lid body 1 and the grooves 4 are formed from a flexible and resilient material, such as silicone, rubber, or the like, such that the grooves 4 are configured to sealingly press against the opening of a container when the lid 100 is engaged with the container as depicted in FIG. 1.

In this embodiment, the grooves 4 are integral with the lid body 1. In other embodiments, the grooves 4 are a separate piece affixed to the lid body 1 by any acceptable fixing technique.

While the grooves 4 depicted in this embodiment of the lid 100 are circular, the grooves have other shapes in other embodiments, such as squares, rectangles, ovals, and other regular and irregular shapes. The grooves 4 should in any event have shapes that correspond to the top of the container that the lid body 1 is intended to seal.

The annular face 12 extends substantially vertically when the lid 100 is properly disposed on the upright container 5. The lugs 3, in this embodiment, extend radially out from the annular face 12.

As depicted in FIG. 2, the through hole 31 extends along the direction perpendicular to the inner face 10 of the lid body 1. In this embodiment, sidewalls 33 of the through hole 31 have a non-circular shape. Specifically, in this embodiment, the through hole 31 has a crescent-shaped cross-section. The through hole 31 has other shapes in other embodiments, such as circles, triangles, arcs, and other regular and irregular shapes.

In this embodiment, the at last one holding lug 3 additionally includes a projection 32 that extends from the sidewalls 33 into the through hole 31. In some embodiments, the at least one projection 32 forms a second grip portion for a human finger on the sidewall 33 of the through hole 31. In some embodiments, the projection 32 defines an undercut configured to be gripped by a human finger. Accordingly, the through hole 31 is sized and configured to receive a human finger. Thus, lug 31 in general, and the projection 32 in particular defines an actuating surface, along with the first grip portion 35, for a user to install and remove the lid 100 from a container 5.

To install or remove the lid 100 from a container 5, a user at least partially grips the lid 100 by placing at least a portion of a finger into the through hole 31 of at least one holding lug 3. At least one of the first grip portion 35 and the second grip portion formed by the at least one projection 32 inhibits slippage of the finger and facilitates a stable grip of the lid 100. To install the lid 100, the user presses the inner face 10 against the opening of the container 5 so that one of the grooves 4 matching the opening of the container sealingly engages the opening. To remove the lid 100, the user actuates the at least one holding lug 3, e.g. via one or more of the first and second grip portions, to peel the engaged groove 4 off from the opening in the container 5.

In this embodiment, the lid 1 includes two holding lugs 3. Multiple lugs 3 facilitate operation of the lid 1 by users that are left-handed as well as right-handed. For example, a left-handed user may grip the lid 1 with a left hand, and grip the lug 3 on the right in FIG. 1, whereas a right-handed user may use their right hand and grip the lug 3 on the left. Multiple lugs 3 also enable storing a utensil 6 in the lid 100 as depicted in FIG. 1, while also enabling a user to actuate the lid 100 by a further lug 3. In other embodiments, the lid 1 includes one lug or more than two lugs.

In this embodiment, the at least one lug 3 is integral with the lid body 1. Specifically, in this embodiment, the lid 100, including the body 1, grooves 4, and lugs 3, is formed in one piece. In other embodiments, the at least one lug 3 is affixed to the lid body 1 by any acceptable technique.

Figure 3:
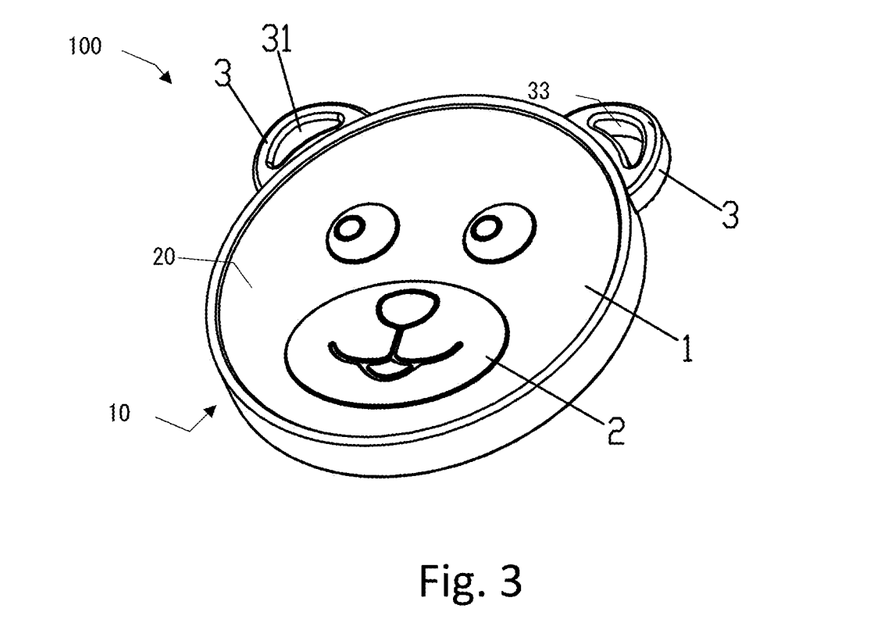
FIG. 3 depicts a perspective view of topside of the lid from FIG. 1.

FIG. 3 depicts a top perspective view of the lid 100 from FIG. 1. As shown in FIG. 3, the lid 100 further includes an outer face 20 opposite the inner face 10 from FIG. 2. The outer face 20 includes the pattern layer 2, which forms an incomplete image. In this embodiment, the pattern layer 2 forms an incomplete image of an animal, such as a bear, dog, cat, etc. Other incomplete images, such as incomplete images of objects, places, people, etc. are also contemplated in other embodiments. In different embodiments, the pattern layer 2 includes a graphical element that forms the incomplete image, a structural element that form the incomplete image, or combinations thereof.

In this embodiment, the pattern layer 2 has indicia and other design elements depicting the face of an animal without ears, and the two lugs 3 are placed at positions that correspond to the position of ears of the depicted animal. Thus, in this embodiment, the two lugs 3 are shaped and positioned to cooperate with the pattern layer 2 to form an image of the animal formed in part by the pattern layer 2. It is noted that the lugs 3 in this embodiment have a substantially identical shape. However, it will be appreciated the lugs 3 may have different shapes, whether or not they are used to enhance or complete an image of depicted on the pattern layer. It will also be appreciate that other embodiments may have a single lug, or more than two lugs.

Although FIG. 1 only depicts a single lid 100, in some embodiments the kit includes a plurality of lids. In some embodiments, the completed images formed by the holding lugs and pattern layers of the various lids in the kit are different. Different images on the lids facilitate differentiating between the contents of containers sealed by the lids, or the intended use for the contents of different containers. For example, different images can be used to differentiate between different wet foods, or different portions of food for different animals or users.

Figure 4:
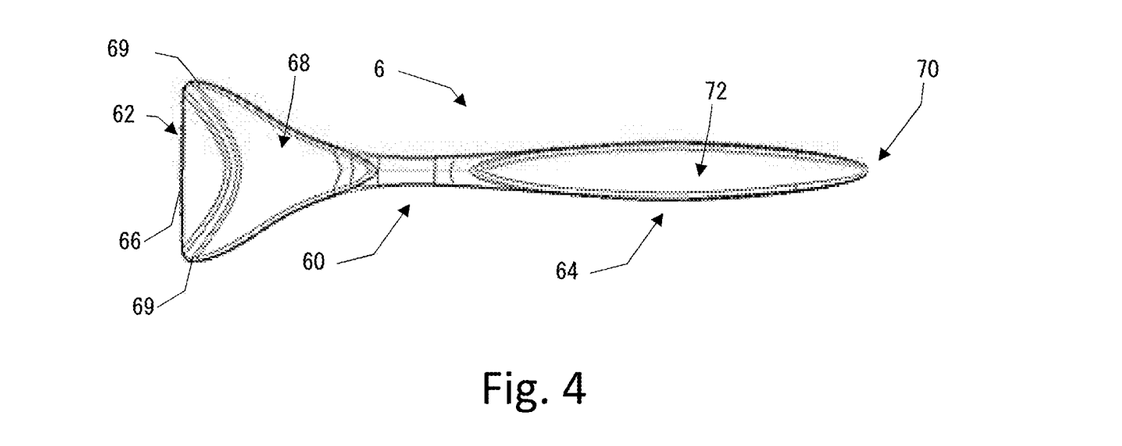
FIG. 4 depicts a top view of the utensil from FIG. 1.
Figure 7:
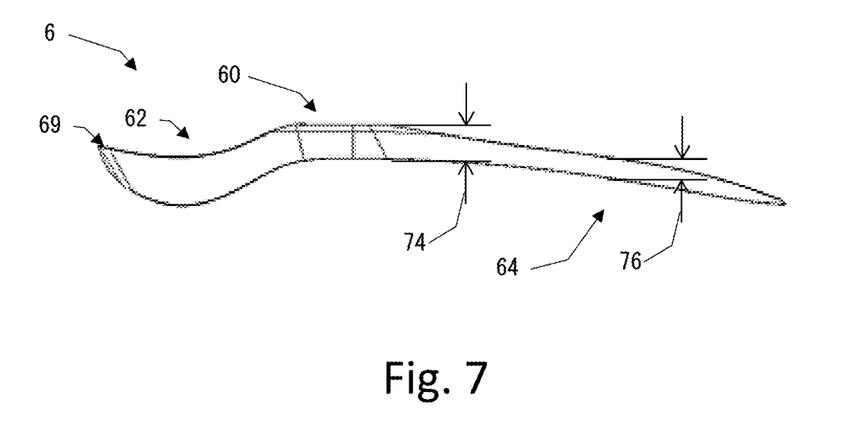
FIG. 7 depicts an image of the utensil of FIG. 6 engaging an inner side wall of the container according to this disclosure.

FIG. 4 depicts a top view of the utensil 6 from FIG. 1, and FIG. 7 depicts a side view of the utensil 6. With reference to FIG. 4, the utensil 6 includes a handle region 60 located between a scoop 62 and a scraper 64.

The scoop 62 has a substantially flat end edge 66, and a first spoon portion 68. The edge 66 is adapted to scrape material off of a flat surface of a container, such as a bottom inner surface of a can, and into the first spoon portion 68. The first spoon portion 68 has a concave shape configured to receive and support material scooped by the scoop 62. The first spoon portion 68 and the edge 66 come together to form a corner portion 69 at each end of the edge 66. The corner portion 69 is adapted to scrape material off of a corner between a flat surface and a side wall.

Figure 5:
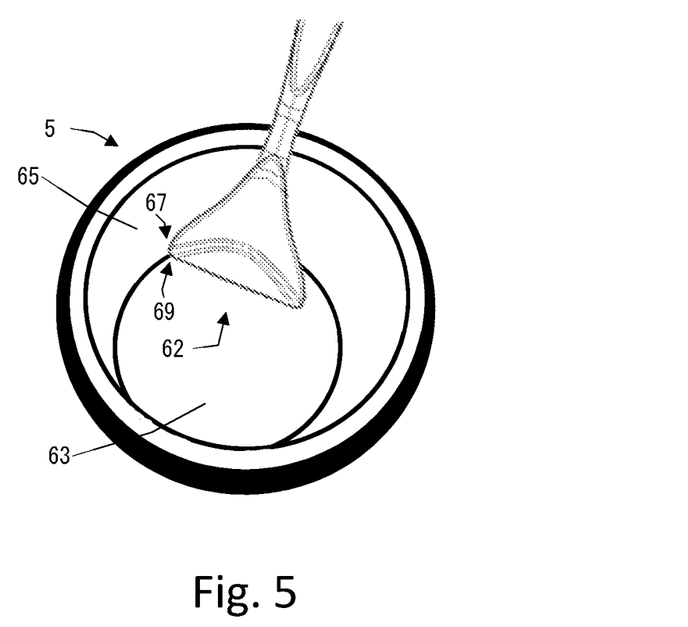
FIG. 5 depicts a side view of the utensil from FIG. 1.

FIG. 5 depicts an image of the scoop 62 in use. In particular, the edge 66 is in use scraping against a bottom inside surface 63 of a container 5, and the corner portion 69 is in use scraping against a corner 67 between the bottom inside surface 63 and a wall 65 of the container 5.

Figure 6:
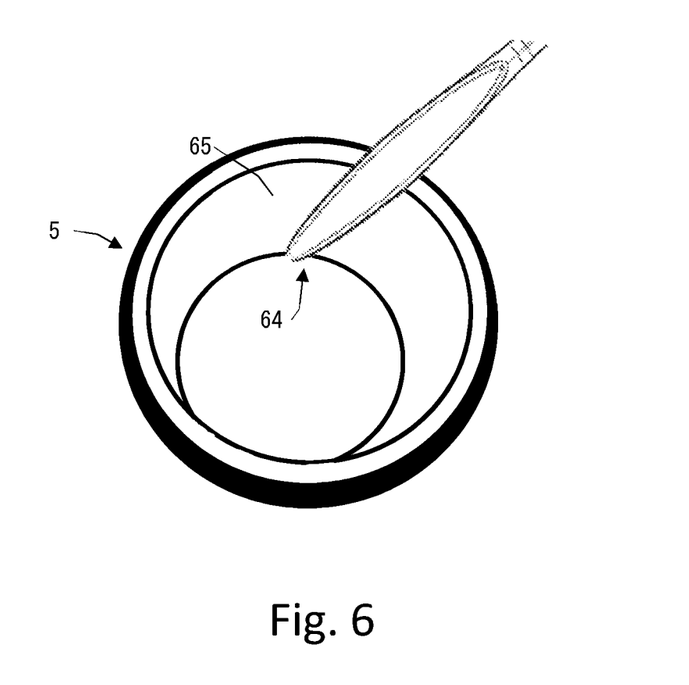
FIG. 6 depicts an image of a utensil engaging a bottom of a container according to this disclosure.

Returning to FIG. 4, the scraper 64 has a tapered end 70, and a second spoon portion 72. The tapered end 70 tapers together at an acute angle, so that the scraper 64 is adapted to scrape material off of a curved inner surface of a container, such as the curved inner side walls of a can, and into the second spoon portion 72. The second spoon portion 72 has a concave shape configured to receive and support material scraped by the scraper 64. FIG. 6 depicts an image of the scraper 64 in use scraping against an inside wall 65 of the container 5.

The combination of the scoop 62 and scraper 64 on the utensil 6 facilitates the removal of material from a wide variety of surfaces in a container. The handler region 60 spaces apart the first spoon portion 68 and second spoon portion 72, so that a user can avoid contact with the material in a container even when the utensil 6 is used on various surfaces in the container.

As depicted in FIG. 1, the utensil 6 in this embodiment is configured to be received in the through hole 31 of at least one of the lugs 3. To this end, the utensil 6 has a cross-section that is congruent, at least in sections, with the cross-section of the through hole 31 in the lid 1 (FIGS. 1-3). The congruent cross-sections facilitate mounting and removing the utensil 6 in the through hole 31.

With reference to FIG. 7, in this embodiment, the utensil tapers from a first diameter 74 that is larger than a diameter of the through hole 31 to a second diameter 76 that is smaller than a diameter of the through hole 31. The diameters 74 and 76 are located such that at least a portion of the handle region 60 of the utensil 6 is located above the lid 100 when the utensil is mounted in the lid. In other words, the larger diameter 74 prevents an entirety of the handle region 60 from passing through the through hole 31, as depicted in FIG. 1. In FIG. 1, at least a portion of the handle region 60 extends above the lid 100, and thus enables a user to easily grasp the utensil 6 without touching the scoop 62, scraper 64, or any material from the container 5 thereon.

In some embodiments, the at least one protrusion 32 in the through hole 31 is configured to engage the utensil 6 to prevent an entirety of the handle region 60 from passing through the through hole 31. In different embodiments, the engagement between the protrusion 32 and the utensil is frictional, geometric, or a combination thereof. In some embodiments, the utensil 6 additionally includes a protrusion or shape (not shown) configured to engage with the protrusion 32 in the through hole.

While the kit 50 in FIG. 1 depicts a single utensil 6, in some embodiments the kit includes a plurality of utensils. In some embodiments, each utensil has a different cross-section so as to correspond to a different lid in the kit. In some embodiments, the utensils have a similar shape so as to be mountable in different lids in the kit. Providing different utensils for each container, and storing each utensil with its corresponding lid and container can reduce the risk of tainting the contents of one container with the contents of another.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A lid for sealing a container, comprising:
a lid body including:
  an inner face extending in a horizontal manner when the lid is disposed on an upright container; and
  an outer face opposite the inner face, the outer face having a pattern layer with a portion of an image of an object;
a sealing mechanism positioned on the inner face of the lid body, and configured to sealingly engage an opening of the container to enable the lid to seal the opening of the container; and
at least one holding lug integral with and extending radially outward from the lid body, wherein:
  the lid body and the at least one holding lug are formed from a same material;
  the at least one holding lug includes a fully surrounded through hole extending along a direction perpendicular to the extension of the inner face of the lid body;
  the through hole has a shape that is matched to a shape of a utensil, such that the at least one holding lug is configured to receive an end of the utensil via the through hole and mount the utensil on the lid via a resiliency of the material of the at least one holding lug and a friction between the utensil and the material of the at least one holding lug; and
  the at least one holding lug has a shape and position that, together with the shape of the through hole and the portion of the image of the object of the pattern layer, forms the image.

2. The lid of claim 1, wherein the sealing mechanism includes a plurality of concentric sealing grooves extending from the inner face of the lid body along the direction perpendicular to the extension of the inner face.

3. The lid of claim 2, wherein the plurality of concentric sealing grooves are integral with the lid body.

4. The lid of claim 1, wherein the at least one holding lug further includes at least one projection extending from an inner sidewall of the at least one holding lug that defines the through hole.

5. The lid of claim 1, wherein the through hole has a non-circular cross section.

6. A kit for sealing an open container, comprising:
a utensil including:
  a spoon region; and
  a handle region that tapers down in a direction away from the spoon region from a first diameter to a second diameter; and
a lid, including:
  a lid body having:
    an inner face extending in a horizontal manner when the lid is disposed on an upright container;
    an outer face opposite the inner face that includes a pattern layer having a portion of an image of an object;
  a sealing mechanism positioned on the inner face of the lid body, and configured to sealingly engage an opening of the container to enable the lid to seal the opening of the container; and
  at least one holding lug extending radially outward from the lid body, and including a fully surrounded through hole extending along a direction perpendicular to the extension of the inner face of the lid body, wherein:
    the through hole has a shape matched to a shape of the handle region of the utensil, such that the at least one holding lug is configured to receive the handle region of the utensil, end first, via the through hole, and mount the utensil on the lid when the lid is engaged with the container;
    the through hole has a third diameter that is between the first diameter and the second diameter such that, when the utensil is mounted in the lid, the at least one holding lug holds (i) a portion of the handle region configured to be gripped by a user and having a diameter greater than the third diameter, and (ii) the spoon region above the lid; and
    the at least one holding lug has a shape and position that, together with the shape of the through hole and the portion of the image of the object of the pattern layer, forms the image.

7. The kit of claim 6, wherein the sealing mechanism includes a plurality of concentric sealing grooves extending from the inner face of the lid body along the direction perpendicular to the extension of the inner face.

8. The kit of claim 7, wherein the at least one holding lug and the plurality of concentric sealing grooves are integral with the lid body.

9. The kit of claim 6, wherein:
the through hole has a non-circular cross-section; and
the utensil has a handle region with a cross-section that is configured to be received in the non-circular cross-section of the through hole.

10. The kit of claim 6, wherein at least one of:
the at least one holding lug is sized and configured to receive a human finger; and
the at least one holding lug further includes at least one projection extending from an inner sidewall of the at least one holding lug that defines the through hole.

11. The kit of claim 10, wherein the at least one holding lug further includes at least one of:
a first grip portion on a portion of the at least one holding lug extending from the inner face of the lid body; and
a second grip portion for the human finger within the through hole.

12. The kit of claim 6, wherein the utensil includes a scoop having a substantially flat end edge configured to scrape against a bottom surface of the container.

13. The kit of claim 12, wherein the end edge and the scoop come together to form a corner portion at each end of the end edge, the corner portion configured to scrape material off from a corner between the bottom surface of the container and an inner wall of the container.

14. The kit of claim 12, wherein the utensil further includes a scraper that tapers at an acute angle and that is configured to scrape against an inner wall of the container.

15. The kit of claim 6, wherein the lid is one of a plurality of similarly configured lids, each lid having a respective pattern layer and at least one holding lug that forms images of different objects.

* * * * *